No. 859,222. PATENTED JULY 9, 1907.
R. G. HOWARD.
WEIGHING MACHINE.
APPLICATION FILED SEPT. 14, 1906.

4 SHEETS—SHEET 2.

Witnesses:
H. B. Davis
Cynthia Doyle.

Inventor:
Robert G. Howard
by Noyes & Harriman
attys.

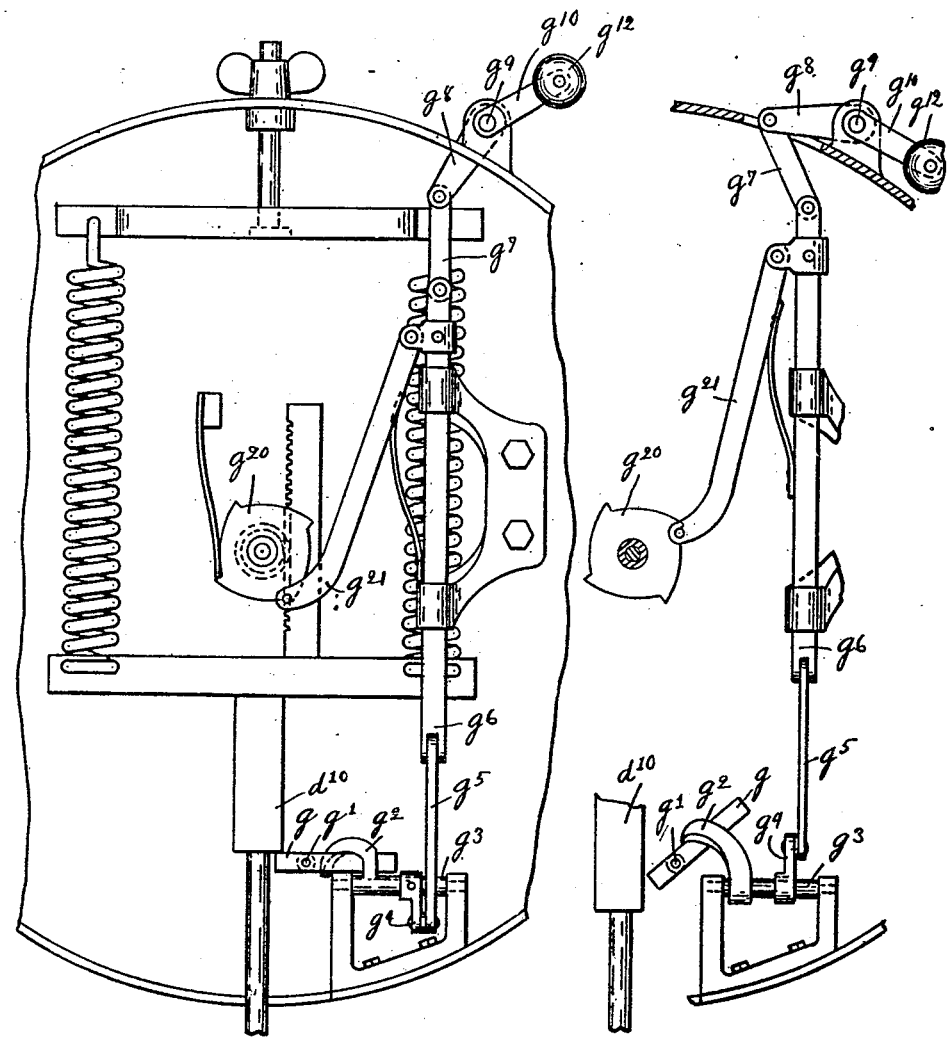

UNITED STATES PATENT OFFICE.

ROBERT G. HOWARD, OF NEWTON, MASSACHUSETTS.

WEIGHING-MACHINE.

No. 859,222.          Specification of Letters Patent.          Patented July 9, 1907.

Application filed September 14, 1906. Serial No. 334,684.

*To all whom it may concern:*

Be it known that I, ROBERT G. HOWARD, of Newton, county of Middlesex, State of Massachusetts, have invented an Improvement in Weighing-Machines, of which the following description, in connection with the accompanying drawings, is a specification, like characters on the drawings representing like parts.

This invention relates to weighing machines, and has for its object to provide a weighing machine with an advertising device adapted to be operated by the means employed for effecting the release of the weighing-mechanism, to bring different advertisements to view or to display one or more different advertisements each time the weighing mechanism is released;
and also to provide means for again operating said advertising device upon the ascent of the platform.

Figure 1:
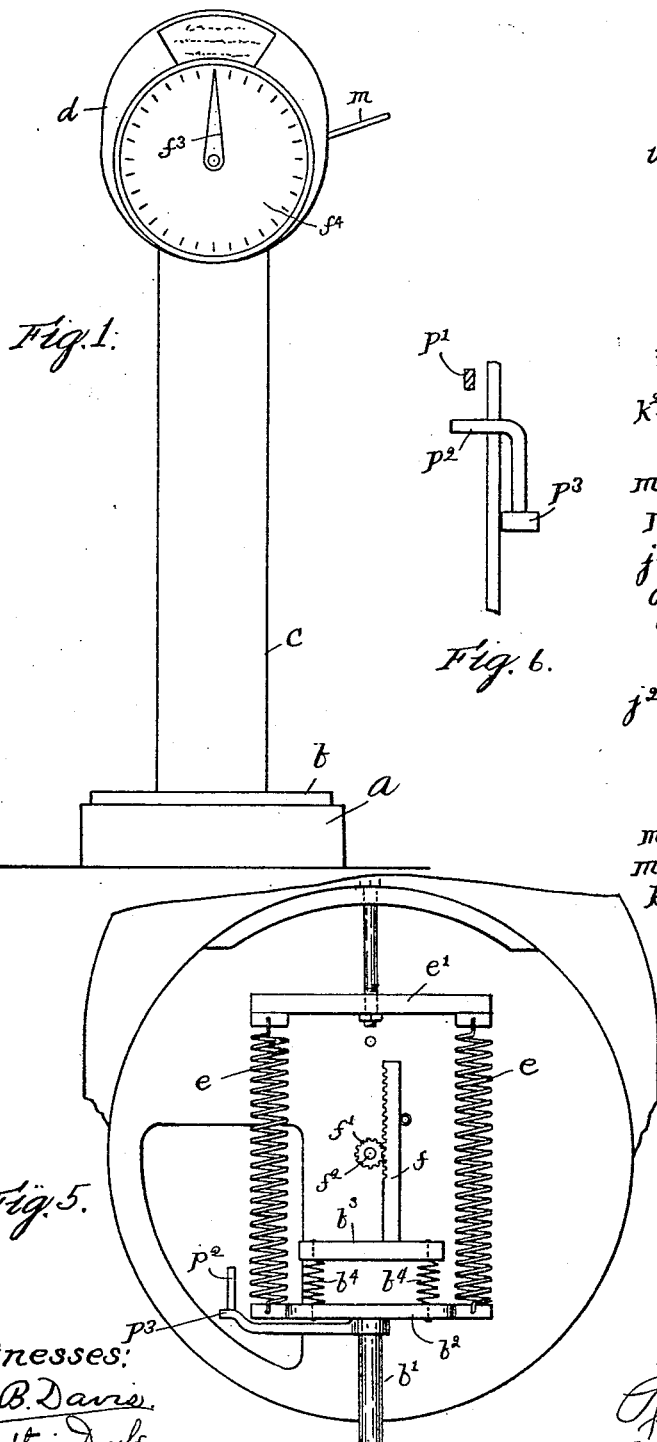
Figure 2:
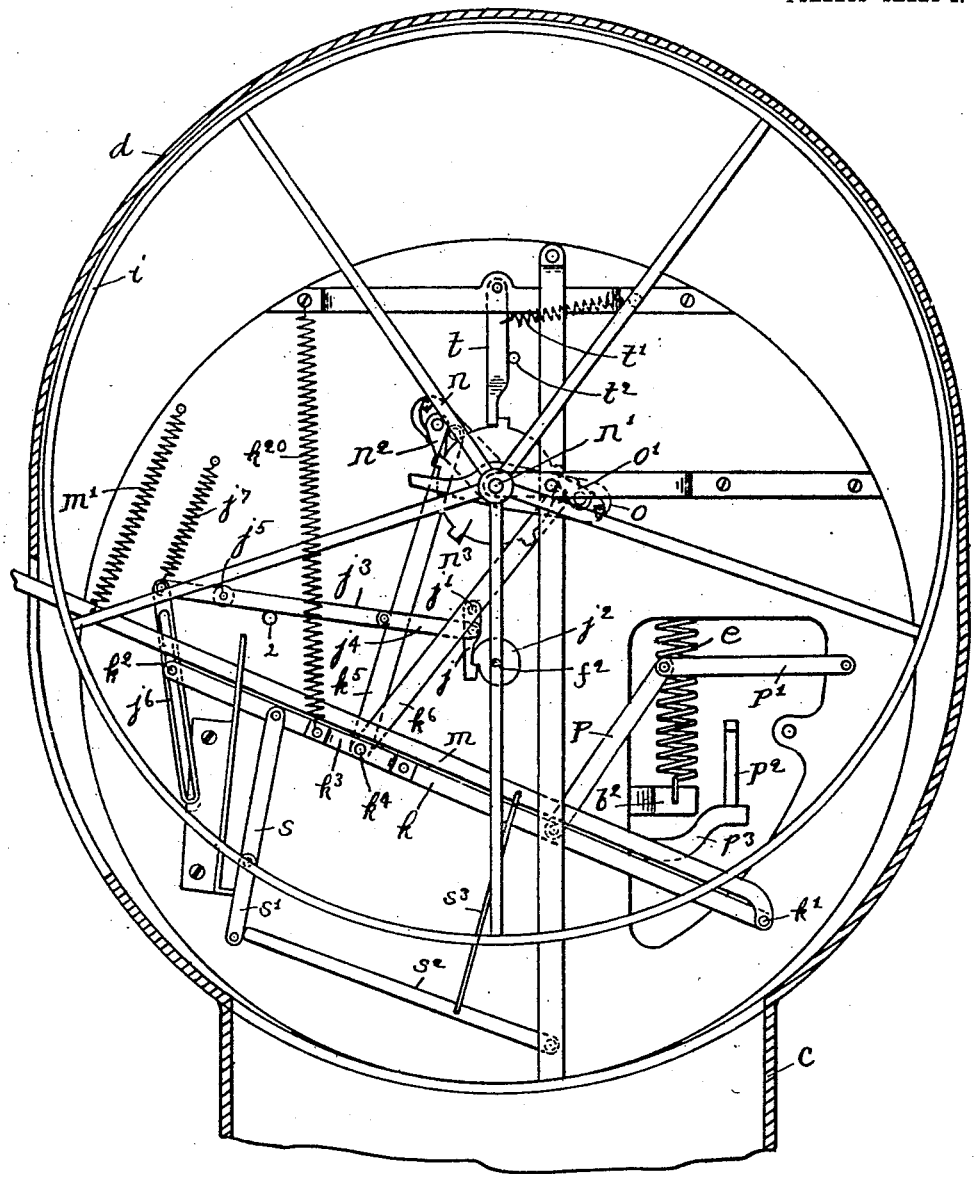
Figure 3:
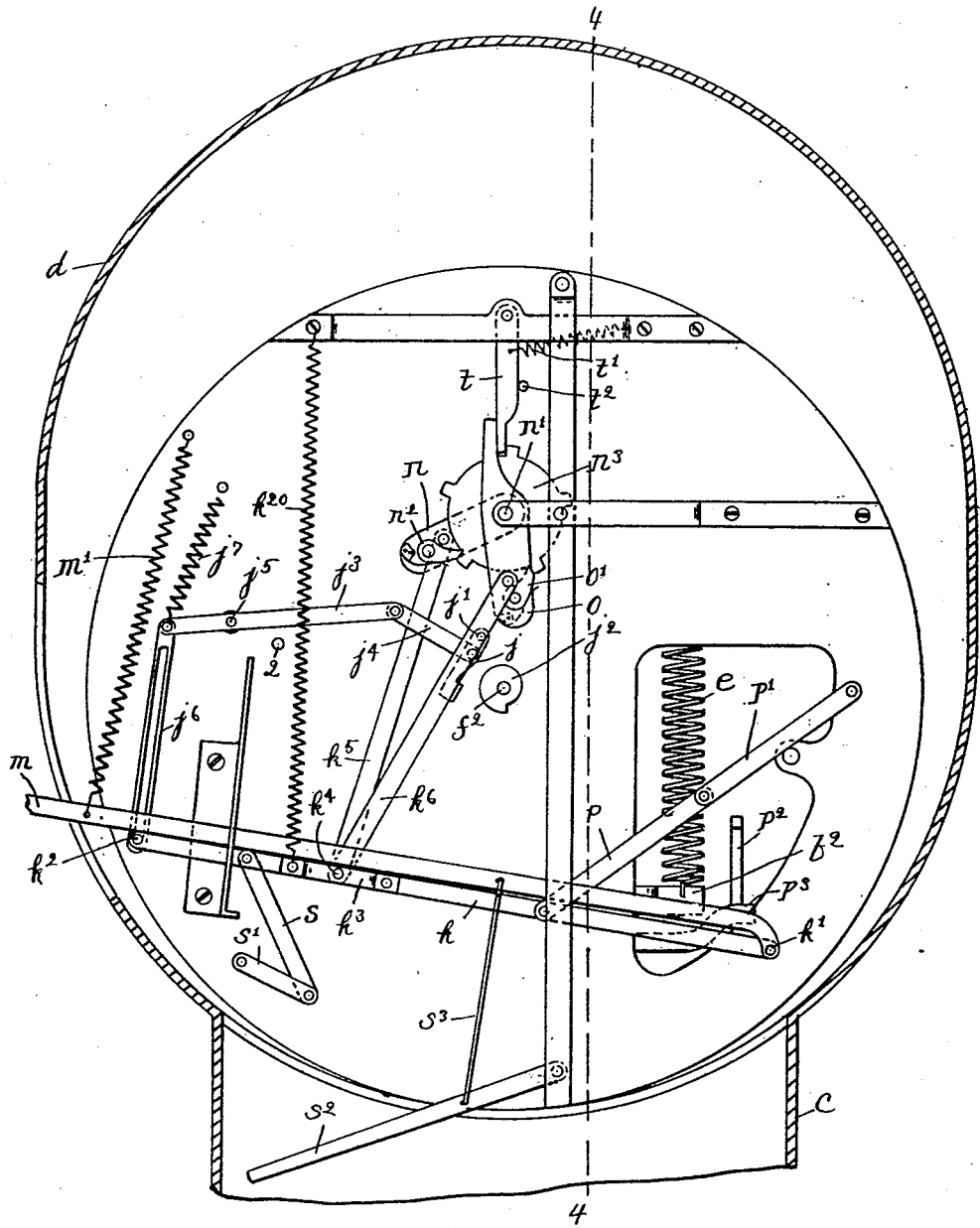

My invention comprehends the employment of a hand-operated actuating-device which is adapted to operate the locking-device to release the weighing-mechanism and also to actuate the advertising device, so that whenever the weighing machine is permitted or caused to operate by the manipulation of said hand-operated actuating-device a different advertisement will be displayed.
My invention also preferably comprehends the employment of means, operated by the rising platform, as for instance, when the object being weighed is removed therefrom, for again operating said advertising device to display a different advertisement.
The locking-device may be arranged to lock the indicating-hand of the weighing-mechanism or some other coöperative part of the weighing-mechanism. The hand-operated actuating-device is exposed and so located as to be within easy reach of the operator.
Figure 1 shows in front elevation a weighing machine embodying this invention. Fig. 2 is an enlarged rear elevation of the head of the machine, showing particularly the locking-device for the weighing-mechanism and the means for operating the advertising device, the parts being in their normal positions of rest. Fig. 3 is a view similar to Fig. 2, the hand-operated actuating-device being pulled down or operated to release the locking-device and to operate the advertising device. Fig. 4 is a vertical section of the head of the machine taken on the dotted line 4—4, Fig. 3. Fig. 5 is a detail showing the weighing springs and means connected with the platform rod for operating the indicating-hand. Fig. 6 is a detail of the means, operated by the rising platform, for controlling the operation of the advertising device. Fig. 7 is a front elevation of the head of the machine showing a modified form of locking-device for the weighing-mechanism and hand-operated actuating-device therefor, the dial plate and advertising device being removed to expose the operating parts. Fig. 8 is a detail of the locking-device and hand-operated actuating-device shown in Fig. 7, the parts being in the positions they will occupy when the hand-operated actuating-device is operated.

$a$ represents the base of the machine, $b$ the platform, $c$ a hollow column rising from the base $a$, $b'$ the platform rod which extends up through the column $c$ and $d$ a circular or other shaped head which is mounted on the column $c$ and which contains the operating parts. The platform rod $b'$ is connected at its upper end to a bar $b^2$, to which the lower ends of the weighing springs $e$, $e$, are attached, the upper ends of said springs being attached to a bar $e'$ which is supported at the top of the head $d$. A rack-bar $f$ is formed upon or erected on a bar $b^3$, which is located above the bar $b^2$. The bar $b^3$ is connected with the bar $b^2$ by springs $b^4$, but in lieu of said springs any other suitable elastic connection may be provided. The rack-bar $f$ extends upward and its teeth engage a pinion $f'$ secured to a shaft $f^2$ having its bearings in the head. To said shaft $f^2$ the indicating-hand $f^3$ is secured which moves over a dial plate $f^4$, set in the front of the head. With the exception of the elastic connection between the bars $b^3$, $b^2$, the weighing-mechanism thus described is common in weighing machines, and is herein shown merely for the sake of illustrating my invention, as I desire it to be understood that my invention comprehends the employment of any equivalent form of weighing-mechanism.

The locking-device for the weighing-mechanism shown in Figs. 3, 4 and 5, consist of a detent-lever $j$ pivoted at $j'$ to the frame and adapted to engage a toothed hub $j^2$, secured to the shaft $f^2$, thereby locking the indicating-hand in a position of rest, yet permitting the other parts of the weighing-mechanism to be operated. A toggle, comprising the pivoted members $j^3$, $j^4$, is pivoted to the frame at $j^5$, and is connected at one end to the detent-lever $j$, and at the opposite end to a slotted link $j^6$ which extends downward. This toggle is held by a spring $j^7$ in its straightened position against a stop 2, with the slotted link $j^6$ in elevated position and with the detent-lever $j$ in engagement with the hub $j^2$, and movement of the toggle out of its straightened position operates to disengage the detent-lever from the hub.

A lever $k$, which serves as the actuating-lever of the hand-operated actuating-device, is pivoted to the frame at $k'$, and bears a pin $k^2$, which enters the slot in the link $j^6$, and when said lever is depressed the pin $k^2$ will travel along said slot until it arrives at the lower end thereof, and will then engage the link and move it to operate the toggle $j^3$, $j^4$, to disengage the locking-device from the weighing-mechanism. The actuating-lever $k$ has a strap $k^3$ secured to one side of it, which projects a short distance laterally, and which serves as a bearing for one end of a shaft $k^4$ by which two links $k^5$, $k^6$, are pivotally connected to the lever. Above the lever $k$ a lever $m$ is located, which is pivoted at $k'$, and which is made long enough to extend through a hole in the side of the head. Its exposed end portion is formed as a hand-piece, adapted to be engaged by the operator for the purpose of depressing it. The lever $m$ serves as the hand-lever of the hand-operated actuating-device. The hand-lever $m$ extends over the projecting strap $k^3$, so as to engage said strap when depressed, to thereby depress the lever $k$. Any other form of extension $k^3$ on the lever $k$ may be provided in lieu of the strap for the accomplishment of this result.

The link $k^5$ is connected to an arm $n$, mounted on a shaft $n'$ and bearing a pawl $n^2$, which is adapted to engage a toothed wheel $n^3$, also mounted on said shaft $n'$. This group of mechanism serves as the primary actuating-device for the advertising device. When the lever $k$ is depressed by the hand-lever $m$ and the locking-device operated to disengage the weighing-mechanism, the pawl-carrying arm $n$ will be moved and the toothed wheel $n^3$ turned a predetermined distance. An advertising disk $i$ is mounted upon the shaft $n'$, which is connected with said toothed wheel $n^3$, so as to be turned with or by said wheel. On the face of said disk $i$ any number of advertisements may be secured or printed or otherwise provided. The disk $i$ is located back of the dial plate $f^4$ and in the face-plate of the head $d$ of the machine a display opening is formed, as for instance, at a point above the dial, for the display of any one of the advertisements on said disk. Thus, it will be seen, that each time the hand-operated actuating-device is operated the locking-device for the weighing-mechanism will be operated and the advertising-device also operated, the former to disengage the weighing-mechanism and the latter to display a different advertisement. When the operator disengages the hand-lever $m$ a spring $m'$, connected to it, returns it to its normal position.

It is herein designed to operate the advertising device twice during each operation of the machine, the first time when the hand-operated actuating-device is operated, and the second time when the person steps from the platform, so that two different advertisements will be brought to view, resulting in the display of three advertisements, as for instance, when the person approaches the machine an advertisement is being displayed, when he operates a machine another advertisement is displayed and when he steps from the platform another advertisement is displayed. In providing for operating the advertising device when the person steps from the platform I utilize the rising platform as the controlling means for the actuating-device of the advertising device. The actuating-device is "set" in condition to operate the advertising device by the operation of the hand-operated actuating-device and is held in such position by a suitable locking-device, the operation of which is controlled by the rising platform. The actuating-device which is thus employed for a second time operating the advertising device is herein termed the secondary actuating-device, and consists of the link $k^6$, which is pivotally connected to the actuating-lever $k$ and which is connected to an arm $o$, mounted on the shaft $n'$ and bearing a pawl $o'$ which also engages the toothed wheel $n^3$. When the lever $k$ is depressed the pawl-carrying arm $o$ will be drawn down and its pawl carried over one or more of the teeth of the wheel $n^3$ into position to engage a tooth thereof, so as to turn said wheel on the return movement, of the arm, in the same direction as the wheel is turned by the primary actuating-device. The return movement of the arm occurs on the return or rising movement of the actuating-lever $k$. The actuating-lever $k$ is returned by the spring $k^{20}$, which is connected to it, but its return movement is herein shown as controlled by the platform, as for instance, when a person standing thereon steps off, and the platform is thereupon permitted to rise, and to accomplish this result a locking-device is provided for holding the actuating-lever $k$ in its lowermost position which is adapted to be operated by the rising platform, whereupon the lever is permitted to resume its normal elevated position. The locking-device herein shown for accomplishing this result consists of a toggle, comprising the pivoted members $p$, $p'$, connected at one end to the lever $k$ and at the other end to the frame, and so arranged as to straighten as the lever $k$ is depressed, and to just pass the line intersecting its end connections when said lever arrives at its lowermost position to thereby act to hold the lever down. A pin $p^2$ is located beneath the toggle $p$, $p'$, which extends upward from an arm $p^3$, extended laterally from the platform rod, and when the platform rod rises, as it will when the weight is removed from it, said pin $p^2$ will strike one member of said toggle, as $p'$, and move the toggle past the line intersecting its end connections, and then the spring $k^{20}$ will act to return the lever $k$. During the upward movement of the lever $k$ the pawl-carrying arm $o$ is operated to turn the toothed wheel which is connected with the advertising disk in the same direction as it was turned by the primary actuating-device, and a different advertisement will be displayed.

It will be seen that the secondary actuating-device is set in position to operate and turn the advertising disk by the hand lever $m$, and that it is locked in such position by the toggle $p$, $p'$, and when the platform rises, said toggle is moved to permit the actuating-device to operate. Furthermore, that the locking-device for the weighing-mechanism is operated to release the weighing-mechanism by the means provided for setting the actuating-device in position to operate, and also that said locking-device is permitted or caused to resume its normal position when said actuating-device resumes its normal position.

I desire it to be understood that either the primary or the secondary actuating-device may be omitted and in such case the means provided for operating it will also be omitted.

A locking-device is also provided for holding the actuating-lever $k$ in its elevated position, which, as herein shown, consists of a toggle, comprising the pivoted members $s$, $s'$, connected at one end to the actuating-lever $k$, and at its other end to the frame, and a detent-lever $s^2$ is pivoted to the frame which is adapted to engage said toggle and hold it in its straightened position, and said detent-lever $s^2$ is connected by a link $s^3$, with the hand-lever $m$. At the beginning of the downward movement of the hand-lever $m$, the detent-lever $s^2$ will be depressed and the toggle $s$, $s'$, disengaged and the lever $k$ released. To insure the toothed wheel $n^3$ occupying its correct position with respect to the pawls in order that the pawls may correctly engage the teeth thereof, a detent $t$ is provided, which is held by a spring $t'$ against a pin $t^2$ and in position for its lower end to engage the teeth of the toothed wheel and thereby check its rotary movement.

I do not desire to limit my invention to the particular form of hand-operated actuating-device herein shown for operating the locking-device of the weighing-mechanism, and for operating the advertising device, neither do I desire to limit my invention to the construction herein shown of the primary or the secondary actuating-device for the advertising device.

Referring to Figs. 7 and 8 a modified form of locking-device is shown adapted to engage a part of the weighing-mechanism, whereby the parts thereof are held at rest; and also a modified form of actuating-means for the advertising device, both of which modifications come within the scope of my invention. The locking-device shown in said figures is adapted to engage a depending portion $d^{10}$ of the bar to which the platform-rod is attached, or it may engage the platform-rod, or in fact any other part of the weighing-mechanism. The locking-device consists of a detent-lever $g$ pivoted at $g'$, one end of which is adapted to extend beneath the end of the depending portion $d^{10}$ of the frame and the other end of which is engaged by a releasing-arm or lever which is herein represented as a curved arm $g^2$, secured to a shaft $g^3$ supported in suitable bearings. The curved arm $g^2$ is constructed and arranged to normally hold the detent-lever in engagement with said depending portion $d^{10}$, to thereby hold the parts at rest, but when the shaft bearing said arm $g^2$ is rocked, said arm will be swung in an upward direction releasing the pressure upon the detent-arm and the weight upon the platform-rod will act to draw said rod downward, the detent-lever turning freely on its pivot when the releasing arm is removed and the pressure upon it is thus released, as represented in Fig. 8. An arm $g^4$ is secured to the shaft $g^3$, which is connected by a link $g^5$, with the lower end of an upright bar $g^6$, supported in suitable bearings whereby it is adapted to slide freely in a vertical direction, and the upper end of said sliding-bar is connected by a link $g^7$ with an arm $g^8$ which is pivoted at $g^9$ and has secured to it an arm $g^{10}$ bearing a hand-engaging knob $g^{12}$. The hand-engaging knob $g^{12}$ is accessible and when engaged and pulled downward from the position shown in Fig. 7 to the position shown in Fig. 8, the arm $g^8$ will be lifted and the bar $g^6$ drawn up and the shaft $g^3$ rocked to turn the releasing-lever or arm and remove it from engagement with the detent-lever to thereby release the weighing-mechanism. $g^{20}$ represents a ratchet-wheel which is secured to the advertising disk and $g^{21}$ a pawl engaging it which is connected with the vertically sliding bar $g^6$ and which is drawn up with said bar to turn the ratchet wheel and thereby operate the advertising disk.

Having thus described my invention, what I claim as new and desire to secure by Letters Patent is:—

1. In a weighing machine, the combination with weighing-mechanism having a locking-device, of an advertising device, a hand-operated actuating-device for operating said locking-device to release the weighing-mechanism and for operating said advertising device to display a different advertisement, substantially as described.

2. In a weighing machine, the combination with weighing-mechanism having a locking-device, of an advertising device, a hand-operated actuating-device, means connecting it with said locking-device and means connecting it with said advertising device, for operating them both, whereby a different advertisement will be displayed when the machine is operated, substantially as described.

3. In a weighing machine, the combination with weighing-mechanism having a locking-device, of a face plate having a display opening, an advertising disk located back of said face plate, a hand-operated actuating-device, means connecting it with said locking-device and means connecting it with said advertising disk, for operating them both, whereby a different advertisement will be displayed at the display opening when the machine is operated, substantially as described.

4. In a weighing machine, the combination with weighing-mechanism having a locking-device, of a face plate having a display opening, an advertising disk located back of said face plate, a ratchet wheel connected to it, a pawl engaging said ratchet wheel, a hand-operated actuating-device connected with said locking-device and also with said pawl, for operating them both, to thereby release the weighing-mechanism and turn the advertising disk, substantially as described.

5. In a weighing machine, the combination with weighing-mechanism having a locking-device, of an advertising device, an actuating-device for said advertising device, an actuating-lever to which said actuating device and said locking-device are both connected, and means for operating said actuating-lever, substantially as described.

6. In a weighing machine, the combination with weighing-mechanism having a locking-device, of an advertising-device, an actuating-device for said advertising device, an actuating-lever to which said actuating device and said locking-device are both connected, and a hand-lever for operating said actuating-lever, substantially as described.

7. In a weighing machine, the combination with weighing-mechanism having a locking-device, of an advertising device, an actuating-device for said advertising device, an actuating-lever to which said actuating-device and said locking-device are both connected, a locking-device for holding said actuating-lever in its normal position, and means for operating said actuating-lever, substantially as described.

8. In a weighing machine, the combination with weighing-mechanism having a locking-device, of an advertising device, an actuating-device for said advertising device, an actuating-lever to which said actuating-device and said locking-device are both connected, a locking-device for holding said actuating-lever in its normal position, and means for operating said locking-device and said actuating-lever, substantially as described.

9. In a weighing machine, the combination with weighing-mechanism having a locking-device, means for operating said locking-device to release the weighing-mechanism, and an advertising-device also adapted to be operated by said means to display a different advertisement whenever the machine is operated, substantially as described.

10. In a weighing machine, the combination with weighing mechanism, of an advertising device, an actuating-device for operating said advertising-device to successively display the advertisements, and a controlling-device for the weighing-mechanism adapted to be operated by said actuating-device, whereby the weight will be obtained only when the advertising-device is operated, substantially as described.

11. In a weighing machine, the combination with weighing mechanism having a locking-device, means for operating said locking-device to release the weighing-mechanism, and an advertising-device also adapted to be operated by said means to display a different advertisement whenever the machine is operated, and means for also operating said advertising device adapted to be operated by the rising platform, substantially as described.

12. In a weighing machine, the combination with weighing-mechanism, of an advertising device, an actuating-device for said advertising device, means for setting said actuating-device in condition to operate, means for locking it until released, and means, operated by the rising platform, for releasing said actuating-device, substantially as described.

13. In a weighing machine, the combination with weighing-mechanism, of an advertising device, an actuating-device for said advertising device, hand-operated means for setting said actuating-device in condition to operate, means for locking it until released, and means, operated by the rising platform, for releasing said actuating-device, substantially as described.

14. In a weighing machine, the combination with weighing-mechanism, of an advertising device, an actuating-device for said advertising device, means for moving said actuating-device into position to operate the advertising device and means for locking it in such position, and means, operated by the rising platform, for releasing it, substantially as described.

15. In a weighing machine, the combination with weighing-mechanism, of a face-plate having a display opening, an advertising disk back of said face-plate, means for moving it step by step, means for setting said actuating means in condition to operate the disk, means for locking it until released, and means, operated by the rising platform, for releasing said actuating means, substantially as described.

16. In a weighing machine, the combination with weighing-mechanism, of a face-plate having a display opening, an advertising disk back of said face-plate, means for moving it step by step, hand-operated means for setting said actuating means in condition to operate the disk, means for locking it until released, and means, operated by the rising platform, for releasing said actuating means, substantially as described.

17. In a weighing machine, the combination with weighing-mechanism, of a face-plate having a display opening, an advertising disk back of said face-plate, means for moving it step by step, means for moving said actuating means into position to advance the disk, means for locking the actuating means in such position, and means, operated by the rising platform, for releasing said actuating means, substantially as described.

18. In a weighing machine, the combination with weighing-mechanism, of a face-plate having a display opening, an advertising disk back of said face-plate, a toothed wheel connected with it, a pawl engaging said toothed wheel, a pawl-carrying arm, an actuating-lever, a link connecting the pawl-carrying arm with said actuating-lever, means for moving said actuating-lever into position to operate the disk, a locking-device for holding it in such position and means, operated by the rising platform, for releasing said locking-device, substantially as described.

19. In a weighing machine, the combination with weighing-mechanism, of an advertising device, an actuating-device for said advertising device, an actuating-lever connected with said actuating-device, means for moving said actuating-lever into position to operate the actuating-device and advance the disk, a locking-device for holding said actuating-lever in such position and means, operated by the rising platform, for releasing said locking-device, substantially as described.

20. In a weighing machine, the combination with weighing-mechanism, of an advertising device, an actuating-device for said advertising device, an actuating-lever connected with said actuating-device, means for moving said actuating-lever into position to operate the actuating-device and advance the advertising device, a toggle, connected with said actuating-lever, for holding it in such position, and means, operated by the rising platform, for moving said toggle to release the actuating-lever, substantially as described.

21. In a weighing machine, the combination with weighing-mechanism, of an advertising device, an actuating-device for said advertising device, an actuating-lever connected with said actuating-device, means for moving said actuating-lever into position to operate the actuating-device and advance the advertising device, a toggle, connected with said actuating-lever, for holding it in such position, a pin borne by an arm on the platform-rod for moving said toggle to release the actuating-lever as the platform rises, substantially as described.

22. In a weighing machine, the combination with weighing-mechanism, of an advertising device, an actuating-device for said advertising device, an actuating-lever connected with said actuating-device, a hand-lever for moving said actuating-lever into position to operate the actuating-device and move the advertising device, a locking-device for holding said actuating-lever in such position, and means, operated by the rising platform, for releasing said locking-device, substantially as described.

23. In a weighing machine, the combination with weighing-mechanism having a locking-device, of an advertising device, an actuating-device for said advertising device, means for setting said actuating-device in condition to operate and for operating said locking-device to release the weighing-mechanism, and means, operated by the rising platform, for releasing said actuating-device, substantially as described.

24. In a weighing machine, the combination with weighing-mechanism having a locking-device, of an advertising device, an actuating-device for said advertising device, hand-operated means for setting said actuating-device in condition to operate and for operating said locking-device to release the weighing-mechanism, and means, operated by the rising platform, for releasing said actuating-device, substantially as described.

25. In a weighing machine, the combination with weighing-mechanism having a locking-device, of an advertising device, an actuating-device for said advertising device, means for setting said actuating-device in condition to operate and for operating said locking-device to release the weighing-mechanism, and means, operated by the rising platform, for releasing said actuating-device and for controlling the return of said locking-device to its normal position, substantially as described.

26. In a weighing machine, the combination with weighing-mechanism having a locking-device, of an advertising device, an actuating-device for said advertising device, means for moving said actuating-device into position to operate the advertising device and for operating said locking-device to release the weighing-mechanism, means for locking said actuating-device in such position and means, operated by the rising platform, for releasing said actuating-device, substantially as described.

27. In a weighing machine, the combination with weighing-mechanism having a locking-device, of an advertising device, an actuating-device for said advertising-device, an actuating-lever connected with said actuating-device, a hand-lever for moving it to set the actuating-device in condition to operate and to also operate the locking-device to release the weighing-mechanism, a locking-device for locking said actuating-lever in such position, and means, operated by the rising platform, for releasing said locking-device, substantially as described.

28. In a weighing machine, the combination with weighing-mechanism, of an advertising device, a primary actuating-device therefor and a secondary actuating-device therefor, and means for operating said actuating-devices successively, and for also controlling the operation of said weighing-mechanism, substantially as described.

29. In a weighing machine, the combination with weighing-mechanism, of an advertising device, a primary actuating-device therefor, means for operating it, a secondary actuating device therefor, adapted to be set in condition to operate by the means employed for operating the primary actuating-device, means for locking it until released, and means operated by the rising platform for releasing it, substantially as described.

30. In a weighing machine, the combination with weighing-mechanism, of an advertising device, a primary actuating-device, therefor and a secondary actuating device therefor, hand-operated means for operating said primary actuating-device and for setting said secondary actuating-device in condition to operate, means for locking said secondary actuating device until released, and means, controlled by the rising platform, for releasing said secondary actuating-device, substantially as described.

31. In a weighing machine, the combination with weighing-mechanism, of an advertising device, a primary actuating-device therefor, a secondary actuating-device therefor, means for operating said primary actuating-device and for setting said secondary actuating-device in condition to operate, a locking-device for holding said secondary actuating-device in condition to operate, and means, controlled by the rising platform, for operating said locking-device to set the secondary actuating-device, substantially as described.

32. In a weighing machine, the combination with weighing-mechanism having a locking-device, of an advertising device, a primary actuating-device therefor and a secondary actuating-device therefor, means for operating said primary actuating-device and for setting said secondary actuating-device in condition to operate and for also operating said locking-device, and means, controlled by the rising platform, for releasing said secondary actuating device, substantially as described.

33. In a weighing machine, the combination with weighing-mechanism having a locking-device, of an advertising device, a primary actuating-device therefor and a secondary actuating-device therefor, means for operating said primary actuating-device and for setting said secondary actuating-device in condition to operate and for also operating said locking-device, a locking-device for holding said secondary actuating-device in condition to operate, and means, controlled by the rising platform, for operating said last named locking-device to release said secondary actuating-device, substantially as described.

34. In a weighing machine, the combination with weighing-mechanism having a locking-device, of an advertising device, a primary actuating-device therefor and a secondary actuating-device therefor, means for operating said primary actuating-device and for setting said secondary actuating-device in condition to operate and for also operating said locking-device, a locking-device for holding said secondary actuating-device in condition to operate, and means, controlled by the rising platform, for operating said last named locking-device to release said secondary actuating-device and also to return the first named locking-device, substantially as described.

35. In a weighing machine, the combination with weighing-mechanism, of an advertising device, a primary actuating-device therefor, and a secondary actuating-device therefor, an actuating-lever to which both of said actuating-devices are connected, and means for operating said lever to successively operate said actuating-devices and also control the operation of the weighing-mechanism, substantially as described.

36. In a weighing machine, the combination with weighing-mechanism having a locking-device, of an advertising device, a primary actuating-device therefor, a secondary actuating-device therefor, an actuating-lever to which both of said actuating-devices are connected and to which said locking-device is also connected, and means for operating said actuating-lever, substantially as described.

37. In a weighing machine, the combination with weighing-mechanism, of an advertising device, a primary actuating-device therefor, a secondary actuating-device therefor, an actuating-lever to which both of said actuating-devices are connected, means for operating said actuating-lever to operate the primary actuating-device and to set the secondary actuating-device in condition to operate, means for locking it until released, and means, controlled by the rising platform, for releasing said secondary actuating-device, substantially as described.

38. In a weighing machine, the combination with weighing-mechanism, of an advertising device, a primary actuating-device therefor, a secondary actuating-device therefor, an actuating-lever to which both of said actuating-devices are connected, means for operating said actuating-lever to operate the primary actuating-device and to set the secondary actuating-device in condition to operate, a locking-device for holding said actuating-lever with the secondary actuating-device set, and means, controlled by the rising platform, for operating said locking-device to release the actuating lever and its connected actuating-device, substantially as described.

39. In a weighing machine, the combination with weighing-mechanism having a locking-device, of an advertising device, a hand-operated actuating-device, means connecting it with said locking-device and means connecting it with said advertising device, for operating them both, and means, operated by the rising platform for also operating said advertising device, substantially as described.

40. In a weighing machine, the combination with weighing-mechanism having a locking-device, of an advertising device, a primary actuating-device therefor and a secondary actuating-device therefor, an actuating-lever to which both of said actuating-devices are connected and to which said locking-device is also connected, means for operating said actuating-lever to operate the locking device for the weighing mechanism, and to operate the primary operating-device and to set the secondary actuating-device in position to operate, and means, controlled by the rising platform, for releasing said secondary actuating-device, substantially as described.

41. In a weighing machine, the combination with weighing-mechanism having a locking-device, of an advertising device, a primary actuating-device therefor and a secondary actuating-device therefor, an actuating-lever to which both of said actuating-devices are connected and to which said locking-device is also connected, means for operating said actuating-lever to operate the locking device for the weighing-mechanism and to operate the primary actuating-device and to set the secondary actuating-device in condition to operate, a locking-device for holding said actuating-lever with the secondary actuating-device set, and means, controlled by the rising platform for releasing said actuating-lever and said secondary actuating-device, substantially as described.

In testimony whereof, I have signed my name to this specification, in the presence of two subscribing witnesses.

ROBERT G. HOWARD.

Witnesses:
B. J. NOYES,
H. B. DAVIS.